US012775861B2

(12) United States Patent
Parrish et al.

(10) Patent No.: US 12,775,861 B2
(45) Date of Patent: Oct. 27, 2026

(54) QUANTUM NUMBER PRESERVING CIRCUITS FOR PREPARING QUANTUM STATES REPRESENTING FERMIONS IN COMPUTATIONAL UNITS-BASED QUANTUM COMPUTERS

(71) Applicants: QC Ware Corp., Palo Alto, CA (US); Covestro Deutschland AG, Leverkusen (DE)

(72) Inventors: Robert Michael Parrish, Woodside, CA (US); Gian-Luca Anselmetti, Cologne (DE); Christian Gogolin, Cologne (DE)

(73) Assignees: QC Ware Corp., Palo Alto, CA (US); Covestro Deutschland AG, Leverkusen (DE)

( * ) Notice: Subject to any disclaimer, the term of this patent is extended or adjusted under 35 U.S.C. 154(b) by 827 days.

(21) Appl. No.: 18/029,617

(22) PCT Filed: Aug. 26, 2021

(86) PCT No.: PCT/US2021/047816
§ 371 (c)(1),
(2) Date: Mar. 30, 2023

(87) PCT Pub. No.: WO2022/072087
PCT Pub. Date: Apr. 7, 2022

(65) Prior Publication Data

US 2023/0359692 A1 Nov. 9, 2023

Related U.S. Application Data

(60) Provisional application No. 63/165,638, filed on Mar. 24, 2021, provisional application No. 63/086,555, filed on Oct. 1, 2020.

(51) Int. Cl.
*G06N 10/20* (2022.01)
*G06N 10/40* (2022.01)
*G06N 10/70* (2022.01)

(52) U.S. Cl.
CPC ............. *G06N 10/20* (2022.01); *G06N 10/40* (2022.01); *G06N 10/70* (2022.01)

(58) Field of Classification Search
CPC ........ G06N 10/00; G06N 10/20; G06N 10/40; G06N 10/60; G06N 10/70; G06N 5/01;
(Continued)

(56) References Cited

U.S. PATENT DOCUMENTS 10,311,370 B2 * 6/2019 Bravyi .................... G06F 17/16
10,483,980 B2 * 11/2019 Sete ....................... G06N 10/20
(Continued)

FOREIGN PATENT DOCUMENTS

AU 2011253919 A1 * 1/2012
AU 2014234949 A1 * 10/2015 ......... H10D 48/3835
(Continued)

OTHER PUBLICATIONS

PCT International Search Report and Written Opinion, International Application No. PCT/US2021/047816, dated Dec. 10, 2021, 12 Pages.
(Continued)

*Primary Examiner* — Steven P Sax
(74) *Attorney, Agent, or Firm* — Fenwick & West LLP

(57) ABSTRACT

A method for preparing states on a quantum computer with given particle number and total spin squared quantum numbers by means of parametrized gates. Explicit decompositions of these gates are given for an embodiment of the method where fermions are mapped to the computational units of the quantum computer by means of a Jordan-Wigner mapping. As an example, the method is advantageous for the
(Continued)

variational optimization of energies of chemical systems and the quantum computation of activation energies of chemical reactions.

20 Claims, 5 Drawing Sheets

(58) Field of Classification Search
CPC .. G16C 10/00; H10D 48/3835; H10D 48/383; G06F 16/9024; G06F 11/1076; G06F 11/004; G06F 15/82
See application file for complete search history.

(56) References Cited

U.S. PATENT DOCUMENTS

| | | | | |
|---|---|---|---|---|
| 11,636,370 | B2 * | 4/2023 | Romero | G06N 10/60 706/62 |
| 11,995,512 | B2 * | 5/2024 | King | G06N 10/40 |
| 2018/0232652 | A1 * | 8/2018 | Curtis | G06F 16/9024 |
| 2019/0095811 | A1 * | 3/2019 | Antonio | G06N 10/60 |
| 2020/0005186 | A1 * | 1/2020 | Romero | G06N 10/60 |
| 2020/0293937 | A1 * | 9/2020 | Babbush | G06N 10/20 |
| 2020/0334107 | A1 * | 10/2020 | Katabarwa | G06F 11/1076 |
| 2020/0356887 | A1 * | 11/2020 | Moodera | H10D 48/3835 |
| 2020/0394549 | A1 * | 12/2020 | Dallaire-Demers | G06N 10/20 |
| 2021/0024638 | A1 * | 1/2021 | Yong | A61P 35/00 |
| 2021/0156037 | A1 * | 5/2021 | Lee | C01B 3/042 |
| 2021/0374307 | A1 * | 12/2021 | Haener | G06F 30/20 |
| 2021/0406749 | A1 * | 12/2021 | Oliver | G06F 11/004 |
| 2022/0092460 | A1 * | 3/2022 | Piveteau | G06N 10/70 |
| 2022/0254453 | A1 * | 8/2022 | Babbush | G16C 10/00 |

FOREIGN PATENT DOCUMENTS

| | | | | |
|---|---|---|---|---|
| CA | 2968830 | A1 * | 11/2018 | G06N 5/01 |
| CA | 3078307 | A1 * | 4/2019 | H10D 48/383 |
| CA | 3085955 | A1 * | 8/2019 | H10D 48/3835 |
| CA | 3093230 | A1 * | 10/2019 | G06N 10/20 |
| CA | 3109643 | A1 * | 2/2020 | G06N 5/01 |
| CA | 3128993 | A1 * | 9/2020 | G06N 10/20 |
| CA | 3129063 | A1 * | 9/2020 | G06N 10/70 |
| CA | 3141547 | A1 * | 12/2020 | G06N 7/01 |
| CA | 3151055 | A1 * | 4/2021 | G06N 5/01 |
| CA | 3144696 | C * | 10/2024 | G06N 10/20 |
| CA | 3130397 | C * | 7/2025 | G06N 10/40 |
| CN | 107038141 | A * | 8/2017 | G06F 15/7807 |
| JP | 2022547989 | A * | 11/2022 | G06N 10/40 |
| JP | 7644515 | B2 * | 3/2025 | G06F 15/82 |
| PT | 116602 | B * | 1/2024 | G06N 10/00 |
| WO | WO-2019126644 | A1 * | 6/2019 | G06N 10/60 |
| WO | WO-2020095051 | A2 * | 5/2020 | G16C 10/00 |
| WO | WO-2020131798 | A1 * | 6/2020 | G06N 10/00 |
| WO | WO-2020181116 | A1 * | 9/2020 | G06N 10/20 |
| WO | WO-2021055000 | A1 * | 3/2021 | G06N 10/60 |

OTHER PUBLICATIONS

Bryan T Gard et al, “Efficient Symmetry-Preserving State Preparation Circuits for the Variational Quantum Eigensolver Algorithm”, arxiv.org, Cornell University Library, 201 Olin Library Cornell University Ithaca, NY 14853,Apr. 24, 2019 (Apr. 24, 2019), pp. 1-10.

Sam Mcardle et al, “Quantum computational chemistry”, *Reviews of Modern Physics*, vol. 92, No. 1, Jan. 17, 2019 (Jan. 17, 2019), XP055693060, DOI: 10.1103/RevModPhys.92.015003, ISSN:0034-6861, p. 17, pp. 20-27.

* cited by examiner

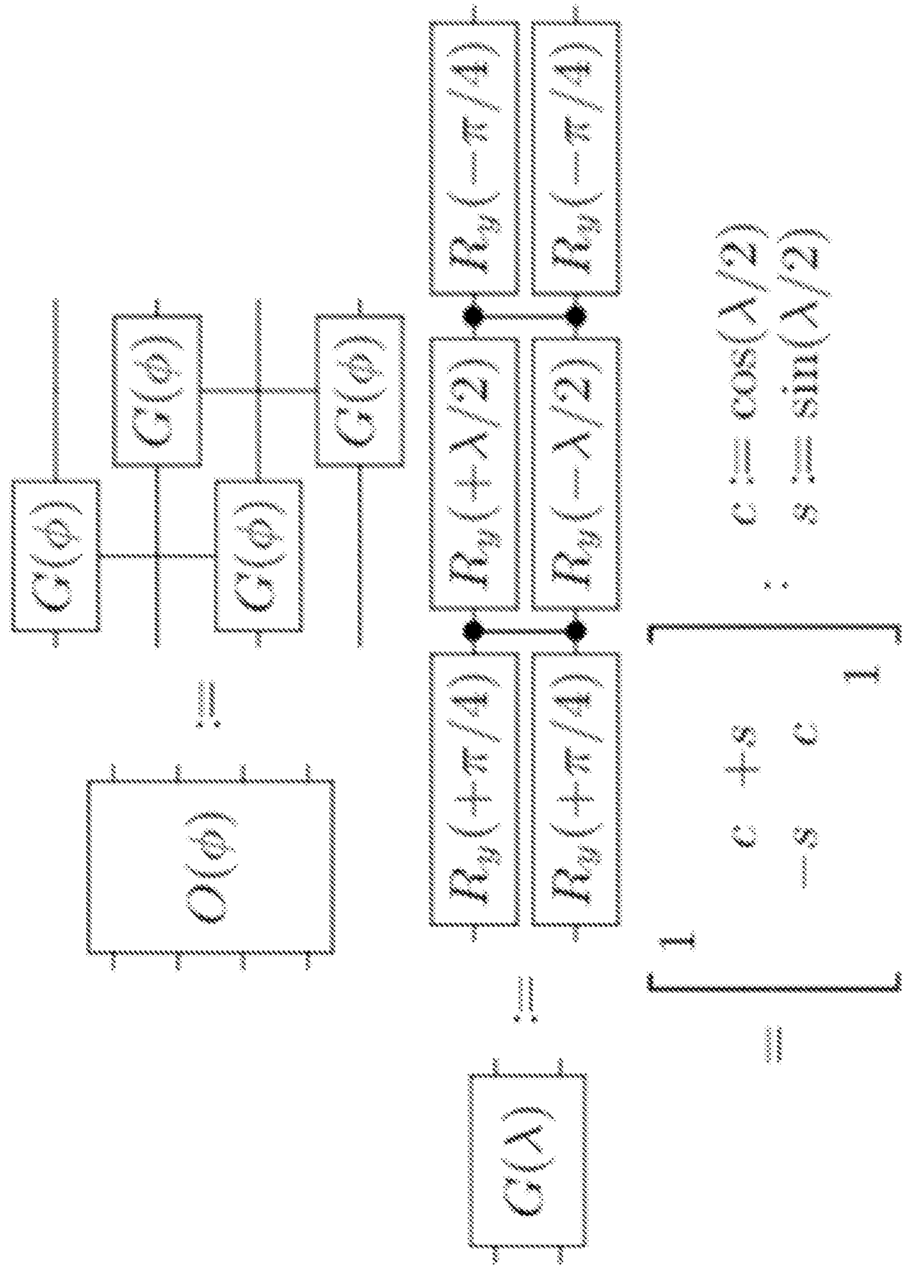
FIG. 5: QNP_OrbitalGivens

QUANTUM NUMBER PRESERVING CIRCUITS FOR PREPARING QUANTUM STATES REPRESENTING FERMIONS IN COMPUTATIONAL UNITS-BASED QUANTUM COMPUTERS

CROSS-REFERENCE TO RELATED APPLICATIONS

This application claims priority to International PCT Application No. PCT/US2021/047816, filed on Aug. 26, 2021, which claims priority to U.S. Provisional Patent Application No. 63/086,555, "Quantum Number Preserving Circuits for Preparing Quantum States Representing Fermions in Qubit-Based Quantum Computers," filed on Oct. 1, 2020 and to U.S. Provisional Patent Application No. 63/165,638, "Quantum Number Preserving Circuits for Preparing Quantum States Representing Fermions in Qubit-Based Quantum Computers-Addendum," filed on Mar. 24, 2021, the subject matter of all of the foregoing is incorporated herein by reference in its entirety.

BACKGROUND

1. Technical Field

This disclosure relates generally to quantum circuits, and more particularly, to quantum number preserving circuits for preparing quantum states representing fermions in computational unit-based quantum computers.

2. Description of Related Art

The variational quantum eigensolver (VQE) is a class of quantum algorithms suitable to solve certain optimization problems, including such of relevance in computational chemistry. Since the inception of the VQE approach in 2014, there have been many proposals for the design and construction of the "entangler circuit" element, also referred to as VQE ansatz or just ansatz.

Prior embodiments typically assume the existence of efficient techniques to initialize an initial quantum state with proper quantum numbers (e.g., the Hartree-Fock state, which can be initialized by a single PauliX gate on each qubit representing an occupied orbital in the Jordan-Wigner representation when starting from the canonical all-zero state).

From this point, prior embodiments typically explore different pathways for the construction of parametrized entangler circuits with favorable properties. The objective of the entangler circuit design is to produce an entangler circuit template with the power to explore a large and chemically important portion of the computational Hilbert space for the underlying molecular problem at hand. Additionally, some of these prior embodiments may preserve one or more of the target molecular quantum numbers $N_\alpha$, $N_\beta$ and s. However, the prior embodiments do not preserve all three quantum numbers while also providing short, e.g., linear or quadratic in the number of qubits, circuit depths with local gates each acting on a small number of qubits (e.g., two) of the entangler circuits proposed in our embodiments

SUMMARY

The present disclosure provides a method for preparing states on a quantum computer with given particle number and total spin squared quantum numbers by means of parametrized gates. Explicit decompositions of these gates are given for an embodiment of the method where fermions are mapped to the computational units of the quantum computer by means of a Jordan-Wigner mapping. As an example, the method is advantageous for the variational optimization of energies of chemical systems and the quantum computation of activation energies of chemical reactions.

One object of the disclosure is a construction of parametrized quantum circuits that have advantageous properties as ansätz for the simulation of fermionic systems with the VQE method. In particular, embodiments of the disclosure proposed here preserve all three quantum numbers $N_\alpha$, $N_\beta$ and s, have a linear (in number of computational units (e.g., qubits) n) or low polynomial, e.g., proportional to $n^2$ or $n^3$, number of gates and parameters and can reach states with seniority larger than zero. Preservation of these three quantum numbers is beneficial for finding accurate approximations to the properties of the fermionic system, because the physically relevant states typically have exactly determined and a priori known values for these quantum numbers.

Accordingly, the disclosure provides a method according to claim 1, a data processing apparatus system according to claim 14, a computer program product according to claim 16 and a computer-readable storage medium according to claim 17. Advantageous embodiments are the subject of dependent claims. They may be combined freely unless the context clearly indicates otherwise.

A method for preparing one or more quantum states in a quantum computer representing states of fermions in m modes comprises:

- mapping the fermions to the computational units of the quantum computer such that subsets of computational units represent subsets of modes of the fermions and a set of the quantum states of the computational units corresponds to a set of quantum states of the fermions;
- initializing one or more initial states of the computational units which correspond to states of the fermions as a result of the mapping, the states of the computational units and the states of the fermions being eigenstates of the respective qubit and fermionic representations of the particle number operators $\hat{N}_\alpha$, $\hat{N}_\beta$ and the total spin squared operator $\hat{S}^2$ with target quantum numbers $N_\alpha$, $N_\beta$, s;
- applying a quantum circuit comprising gates acting on subsets of the computational units of the quantum computer, the gates having zero, one, or more parameters and performing rotations in the subspaces of Hilbert space in which the quantum numbers $N_\alpha$, $N_\beta$, s are preserved, at least one of the gates having the ability to rotate between states with different seniority, the rotations having the property that their rotation angle and/or axis depends on the one or more parameters of the gates, the circuit having the property that its circuit depth grows slower than cubically with the number of computational units n and the number modes m;
- thereby causing the state of the computational units of the quantum computer to end up in a prepared state inside a subspace of states that correspond to states with the property that the quantum numbers $N_\alpha$, $N_\beta$ have values equal to the target values, and the prepared state in that subspace depends on the choice of the parameters; and
- measuring one or more observable quantity of the computational units of the quantum computer.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 5 shows the gate QNP_OrbitalGivens.

DETAILED DESCRIPTION

Figure 1:
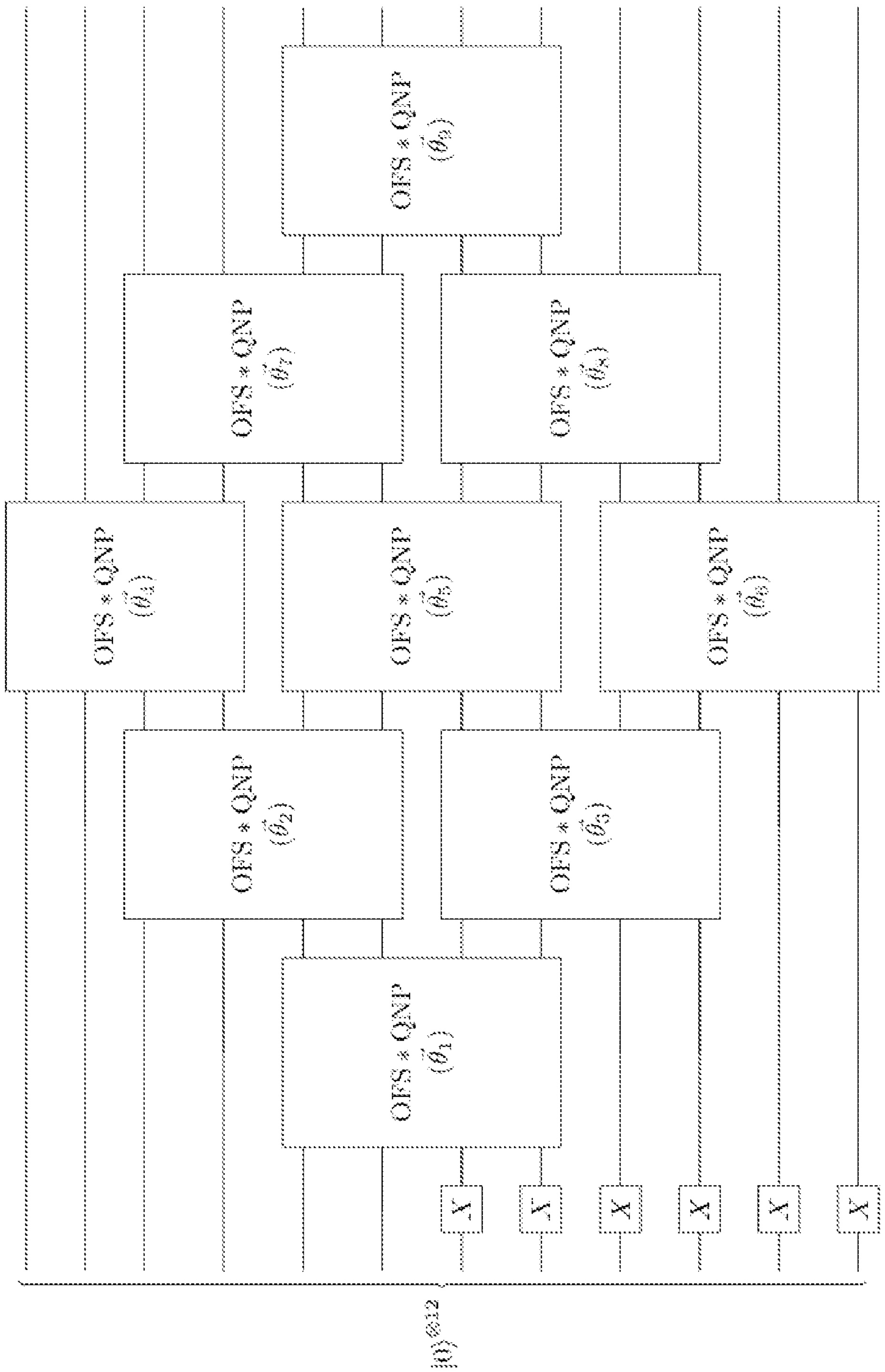
FIG. 1 shows an example of an advantageous quantum circuit.

In the method according to the disclosure, mapping fermions to computational units has the function of enabling computations and simulations of physical systems of fermions, such as the electrons in molecules, on quantum computers using computational units as their elementary computational units. A mapping is an isomorphic embedding of a subspace of the Hilbert space of the fermions into a subspace of the Hilbert space of the computational units. Examples of suitable mappings include the Jordan-Wigner mapping and the Bravyi-Kitaev mapping.

The fermions can for example be electrons in a molecule.

A computational unit of a quantum computer is a logical entity characterized by a discrete or continuous number of controllable quantum states with the property that multiple identical or non-identical computational units can be combined to increase the computational power of the quantum computer by means of quantum coherence appearing between the quantum states of the computational units. Examples of computational units are qubits, qudits, fermions, and bosons.

Qubits can either be physical qubits realized with technologies including superconducting qubits, trapped ions, trapped atoms, photons in waveguides, quantum dots, nitrogen vacancy centers in diamond, nuclear magnetic resonance, or topological quantum computing, or they can be logical qubits of an error correcting or fault tolerant quantum computer. Depending on the technology used, the qubits are carried by different physical entities such as, e.g., an ion in the case of a quantum computer realized with trapped ions or a photon in the case of a quantum computer realized with photos in waveguides, in a similar way as a classical bit can be carried by different physical entities such as the direction of magnetization of a small area of a hard drive or a charged or uncharged capacitator. Depending on the technology used, the hardware may support different gate operations natively, meaning that there is a direct correspondence between a physical action on the one or more carrying physical entities, e.g., such as shining a laser on a set of ions, and the action of the corresponding native gate on the one or more qubits carried by these entities.

As used herein, the term quantum computer can include computationally non-universal quantum computing devices, such as devices that are not BQP (bounded-error quantum polynomial time) complete, also commonly referred to as quantum simulators.

For convenience, the remaining description uses the term 'qubit.' However, references to qubits in the remaining description may be applicable to other types of computational units. The technology used to realize the qubits may impose constraints on which qubits can be made to directly interact with which other qubits, e.g., depending on the positions of the physical entities carrying the qubits, and the technology may allow the movement of qubits either physical or logically. Thereby, physically moving qubits can mean moving the physical carrier inside the quantum computer and logically moving qubits can mean applying one or more SWAP operations to exchange the quantum states of the qubits between different physical carriers.

We denote with the symbol m the number of modes of the fermionic system. In case of a chemical system, m equals the number of spin orbitals of the electrons that are to be simulated.

The particle number operators $\hat{N}_\alpha$ and $\hat{N}_\beta$ count the number of spin up (alpha) and spin down (beta) fermions, i.e., number of particles in fermionic orbitals with spin up and down respectively. $\hat{S}^2$ measures the total spin of the fermions. These operators have a canonical representation in terms of fermionic creation and annihilation operators acting on the Hilbert space of the fermions. Transforming them under the chosen fermion to qubit mapping yields their representation as operators acting on the Hilbert space of qubits. For example, their qubit representation under the Jordan Wigner may be mapped in terms of Pauli matrices.

It is possible to use a specific variant of the Jordan-Wigner mapping, where for the purpose of treating the sign coming from the fermionic anti-commutation relations the fermions are thought to be in a sequential (first all alpha then all beta orbitals) ordering but subsequently the qubits are numbered (starting from zero) in an interleaved fashion such that the qubits corresponding to alpha (beta) orbitals have even (odd) numbers. Here we refer to this as the seq-int Jordan-Wigner mapping.

Quantum states that are eigenstates of the operators $\hat{N}_\alpha$, $\hat{N}_\beta$, and $\hat{S}^2$ tare referred to herein as configurations. An alpha and a beta fermion are said to be paired if they occupy the same spatial orbital. Configurations can then be classified according to the number of unpaired fermions, their so called seniority. A configuration in which all fermions are paired (in the case of an even number of fermions) is said to have seniority zero, a configuration with one unpaired fermion (in the case of an odd number of fermions) is said to have seniority one, a configuration with two unpaired fermions (in the case of an even number of fermions) is said to have seniority two, and so on.

Initializing initial states of qubits has the function of being able to start the quantum computation from well-defined states. The canonical initial state is the all-zero state of the computational basis which, under the standard Jordan-Wigner mapping, is an eigenstate of $\hat{N}_\alpha$, $\hat{N}_\beta$, and $\hat{S}^2$ with eigenvalue zero. Further examples of other initial with states that are eigenstates of $\hat{N}_\alpha$, $\hat{N}_\beta$ under this mapping include those states that can be reached from the all-zero state by flipping subsets of the qubits to their one state, which can be achieved by applying a PauliX Gate, and simple superpositions of such computational basis states can be formed to prepare states that are also eigenstates of $\hat{S}^2$. The physical operations performed in the quantum computer to initialize the all-zero state, to apply PauliX gates, and to superpose the resulting states depend on the physical implementation of the quantum computer. Being Hermitian operators, these operators can be diagonalized, which reveals the subspaces of states in Hilbert space that have the same eigenvalues (also called quantum numbers) with respect to these operators.

Gates are the quantum computing analogs to the logic gates of classical computing. They can be applied to subsets of qubits and transform the state of the quantum computer. The quantum gates are the quantum computing analogues of to the classical logic operations such as AND, OR, XOR, and NAND and they are applied in a similar fashion, just to a quantum state of qubits rather than to a register of bits. Applying AND to two classical bits results in the mapping AND(0, 0)=0, AND(0, 1)=0, AND(1, 0)=0, and AND(1, 1)=1. Similarly quantum gates take qubits as inputs and output qubits in different states depending on the input states. How these gates are actually realized in a hardware implementation of a quantum computer depends strongly on the technology that is used, similarly to how one can realize classical bits and logic gates with transistors, relays, or vacuum tubes.

Gates can be represented or defined by linear algebraic operators. Parametrized gates are those gates whose linear algebraic form depends on one or more parameter.

A (quantum) circuit is a recipe to apply certain gates to certain subsets of qubits in a given order. Some gates have one or more parameters that can be changed to influence the action of the gate. Examples of such gates are the RX, RY, and RZ rotation gates that rotate a single qubit around the axis defined by the PauliX, PauliY, and PauliZ operator respectively. The parameter here is the rotation angle.

The eigenvalues of the operators of $\hat{N}_\alpha$, $\hat{N}_\beta$, and $\hat{S}^2$ are known as quantum numbers. Gates preserve a quantum number if they commute with the respective operator. For example, if the action of a gate is given by an operator $\hat{G}$, then it preserves the spin squared quantum number s if and only if only if $\hat{G}\,\hat{S}^2-\hat{S}^2\hat{G}=0$.

Some gates, such as those acting on disjoint subsets of qubits can be applied in parallel. Other gates, for example ones that do not commute and act on overlapping subsets of qubits, need to be performed in successive time steps. The circuit depth is the minimal number of time steps needed to execute a circuit on a quantum computer. The depth of a circuit constructed according to a recipe can depend on the number of qubits it is to be applied to or the number of fermionic modes m represented by these qubits. The depth can grow with the number of qubits. We say that a quantity such as the circuit depth, or number or parameters grows linearly, quadratically, cubically, polynomially, or exponentially with a quantity x (such for example the number of modes m) if for large values of x the growth of the quantity is approximately described by a linear, quadratic, cubic, polynomial or exponential function. The output of a quantum computation may possibly be further processed classically to derive the sought solution to a given problem or influence following quantum computations. In any case, one measures an observable quantity of the final state of the qubits of the quantum computer. Examples of observable quantities include Hermitian operators such as $\hat{N}_\alpha$ or the Pauli Operators as well as quantities measurable via so-called positive operator valued measurements (POVMs).

In one embodiment the method is a computer-implemented method.

In another embodiment, the computational units of the quantum computer are qubits.

In another embodiment, the computational units of the quantum computer are fermions.

In another embodiment the method further comprises: transmitting and/or receiving a description of the fermionic system and/or the measured observable quantity or results derived from such measured observable quantity to/from the quantum computer.

In another embodiment the parametrized quantum circuit comprises one or more of the quantum number preserving gates QNP_A10B01, QNP_A12B21, QNP_A1B1_PX, QNP_A1B1_PBL, QNP_A1B1_PBU, OrbitalFSWAP. These gates have favorable decompositions into short sequences of elementary gates supported on any universal quantum computer.

In another embodiment representations of the quantum number preserving gates are used that have the property of acting on small subsets of the qubits and the parametrized quantum circuit having the property of bringing subsets of qubits corresponding to different orbitals into positions so that the representations of the quantum number preserving gates can act on them. This is favorable because this allows to reach a large class of states with circuits of low depth and few parameters that are moreover easy to optimize or train by means of an iterative procedure.

In another embodiment the system of fermions describes the electrons of a chemical system comprising one or more molecules.

In another embodiment the parameters are changed with the goal of preparing a state with the target quantum numbers as well as further properties equaling target values or being as high or low as possible, where the further properties are observable quantities or a quantum state of quantities that can be computed from such observable quantities. Examples for such properties include them having a low energy with respect to a Hamiltonian of the fermionic system. As an example, the iterative procedure may train the parameters in a similar way as one would be training a neural network.

In another embodiment the decrease (e.g., minimization) or increase (e.g., maximization) of an observable quantity of the prepared state or states is performed via an iterative procedure. Examples of such iterative procedures include zeroth, first, or higher order methods from optimization, such as the Nelder-Mead simplex algorithm or the Broyden-Fletcher-Goldfarb-Shanno algorithm.

In another embodiment the method further comprises steps to performing a simulation of a chemical reaction or properties of such chemical reaction. An example being the (possibly repeated) usage of the steps from any of the preceding claims to approximate or calculate the energies of one or more chemical system with the intention to deduce the activation or reaction energy of a reaction. In such example one could construct the second quantized Hamiltonian of three chemical systems representing arrangements of atoms in three dimensional space corresponding to the reactants, transition state, and products of the reaction. A VQE algorithm with an ansatz according to the method disclosed here could then be used to perform a minimization of the energy of all three chemical systems. The difference between the minimized energy of the reactants and transition state could yield the activation energy, the difference between the minimized energies of the reactants and products would yield the reaction energy. Another example being the (possibly repeated) usage of the steps from any of the preceding claims to approximate or calculate the absorption or emission spectrum of a molecule.

In another embodiment the quantum computer is either simulated on a classical computer or realized with one of the following approaches: superconducting qubits, trapped ions, trapped atoms, photons in waveguides, quantum dots, nitrogen vacancy centers in diamond, nuclear magnetic resonance, or topological quantum computing.

In another embodiment each qubit is acted on non-trivially by at least one of the gates, i.e., the state vector of the qubits is changed during the computation.

The present disclosure is also directed towards a data processing apparatus system comprising means for carrying out the method of the disclosure.

In one embodiment the apparatus comprises a quantum computer realized with one of the following approaches: superconducting qubits, trapped ions, trapped atoms, photons in waveguides, quantum dots, nitrogen vacancy centers in diamond, nuclear magnetic resonance, or topological quantum computing.

Another aspect of the disclosure is a computer program product comprising instructions which, when the program is executed by a computer, cause the computer to carry out the method of the disclosure.

Another aspect of the disclosure is a computer-readable storage medium comprising instructions which, when executed by a computer, cause the computer to carry out the method of the disclosure.

Examples

The present disclosure will be further described with reference to the following figures and tables without wishing to be limited by them.

FIG. 1 shows an example of an advantageous quantum circuit.

Figure 2:
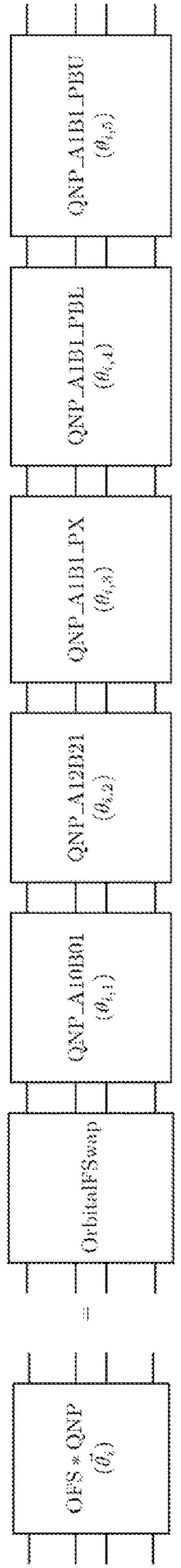
FIG. 2 shows a circuit representation of the decomposition of OFS*QNP gates.

FIG. 2 shows a circuit representation of the decomposition of the OFS*QNP gates.

TABLE 1 shows specific embodiments of quantum number preserving gates and their decompositions. Some gates in this table have one parameter called theta indicated in brackets behind the gate name. We define the gates via their action on the fermionic configurations specified in terms of diagrams in the "Configurations" column. The lines represent two spatial fermionic orbitals and a solid (hollow) dot means it is occupied with an alpha (beta) fermion. We also specify the corresponding computational basis states in standard bra-ket notation under the seq-int Jordan-Wigner mapping. The decompositions are also given for this mapping and the gates being applied to qubits labeled [0, 1, 2, 3]. Under the seq-int Jordan-Wigner mapping the gates preserve the quantum numbers $N_\alpha$, $N_\beta$ and s whenever they are applied to any consecutive set of four qubits starting with an even qubit. For the gates in their decompositions it is specified whether/how the gate depends on this parameter and on which of the four gates [0, 1, 2, 3] it acts, where by qubits=[1,3] means that it should act on qubits 1 and 3. The decompositions are in terms of the standard gates CNOT (controlled not gate), SWAP (swaps two qubits physically or logically), PauliZ (operator marking whether a qubit is in state zero or one with respect to the Z axis), RZ (Z rotation gate), and CRZ (controlled RZ rotation gate), and equivalently for X and Y. We adopt the gate conventions from Ville Bergholm, Josh Izaac, Maria Schuld, Christian Gogolin, M. Sohaib Alam, Shahnawaz Ahmed, Juan Miguel Arrazola, Carsten Blank, Alain Delgado, Soran Jahangiri, Keri McKiernan, Johannes Jakob Meyer, Zeyue Niu, Antal Száva, and Nathan Killoran. *PennyLane: Automatic differentiation of hybrid quantum-classical computations.* 2018. arXiv: 1811.04968.04968 The gates of the decompositions (right column) of Tables 1 and 2 are to be applied from top to bottom in the row order given.

TABLE 1

| Gate and parameter name | Configurations between which the gate rotates | Decomposition into elementary gates and gates with decompositions into elementary gates given in TABLE 2 |
|---|---|---|
| QNP_A10B01(theta) | \|0001⟩<br>\|0100⟩<br>as well as<br>\|0010⟩<br>\|1000⟩ | QNP_A1B0(theta, qubits = [0, 1, 2, 3])<br>QNP_A0B1(theta, qubits = [0, 1, 2, 3]) |
| QNP_A12B21(theta) | \|0111⟩<br>\|1101⟩<br>as well as<br>\|1011⟩<br>\|1110⟩ | QNP_A1B2(theta, qubits = [0, 1, 2, 3])<br>QNP_A2B1(theta, qubits = [0, 1, 2, 3]) |
| QNP_A1B1_PX(theta) | \|0011⟩<br>\|1100⟩ | CNOT(qubits = [0, 1])<br>CNOT(qubits = [1, 0])<br>CNOT(qubits = [3, 4])<br>CNOT(qubits = [4, 3])<br>PauliX(qubits = [4])<br>PauliX(qubits = [1])<br>ANDCReFermionEx(−theta, qubits = [4, 1, 3, 0])<br>PauliX(qubits = [1])<br>PauliX(qubits = [4])<br>CNOT(qubits = [4, 3])<br>CNOT(qubits = [3, 4])<br>CNOT(qubits = [1, 0])<br>CNOT(qubits = [0, 1]) |
| QNP_A1B1_PBL(theta) | \|0011⟩<br>and the equal superposition of<br>\|1001⟩<br>\|0110⟩ | CNOT(qubits = [0, 3])<br>CNOT(qubits = [3, 0])<br>CNOT(qubits = [1, 2])<br>CNOT(qubits = [2, 1])<br>NORCReFermionEx(π/2, qubits = [3, 2, 0, 1])<br>CNOT(qubits = [2, 1])<br>CNOT(qubits = [1, 2])<br>CNOT(qubits = [3, 0])<br>CNOT(qubits = [0, 3])<br>PauliX(qubits = [3])<br>ANDCReFermionEx(−theta, qubits = [1, 3, 0, 2])<br>PauliX(qubits = [3])<br>CNOT(qubits = [0, 3]) |

TABLE 1-continued

| Gate and parameter name | Configurations between which the gate rotates | Decomposition into elementary gates and gates with decompositions into elementary gates given in TABLE 2 |
|---|---|---|
| QNP_A1B1_PBU(theta) | \|1100⟩  and the equal superposition of \|1001⟩  \|0110⟩  | CNOT(qubits = [3, 0])<br>CNOT(qubits = [1, 2])<br>CNOT(qubits = [2, 1])<br>NORCReFermionEx(−π/2, qubits = [3, 2, 0, 1])<br>CNOT(qubits = [2, 1])<br>CNOT(qubits = [1, 2])<br>CNOT(qubits = [3, 0])<br>CNOT(qubits = [0, 3])<br>CNOT(qubits = [0, 3])<br>CNOT(qubits = [3, 0])<br>CNOT(qubits = [1, 2])<br>CNOT(qubits = [2, 1])<br>NORCReFermionEx(π/2, qubits = [3, 2, 0, 1])<br>CNOT(qubits = [2, 1])<br>CNOT(qubits = [1, 2])<br>CNOT(qubits = [3, 0])<br>CNOT(qubits = [0, 3])<br>PauliX(qubits = [0])<br>ANDCReFermionEx(theta, qubits = [0, 2, 1, 3)<br>PauliX(qubits = [0])<br>CNOT(qubits = [0, 3])<br>CNOT(qubits = [3, 0])<br>CNOT(qubits = [1, 2])<br>CNOT(qubits = [2, 1])<br>NORCReFermionEx(−π/2, qubits = [3, 2, 0, 1])<br>CNOT(qubits = [2, 1])<br>CNOT(qubits = [1, 2])<br>CNOT(qubits = [3, 0])<br>CNOT(qubits = [0, 3]) |
| OrbitalFSWAP( ) | Swaps the lower and upper line. | SWAP(qubits = [0, 2])<br>CZ(qubits = [0, 2])<br>SWAP(qubits = [1, 3])<br>CZ(qubits = [1, 3]) |

In an advantageous embodiment the method comprises specific quantum number preserving gates listed in TABLE 1. We define those gates via the quantum number subspace in which they act and the configurations between which they rotate (middle column). We also disclose in TABLE 1 representations of these quantum number preserving gates in terms of the gates from a standard universal set of gates (right column). This makes them straightforward to implement on any universal quantum computer. For the mapping being the seq-int Jordan-Wigner mapping these representations of the gates rotate between the listed configurations and preserve the quantum numbers $N_\alpha$, $N_\beta$ and s whenever they are applied to any sequential set of four qubits starting with a qubit with an even-numbered index.

The specific embodiments of gates have the advantageous effect of acting on a small number (four) of qubits while they can also be combined to circuits with low circuit depth, e.g., linear or quadratic in the number of qubits, that can reach a large number, e.g., exponential in the number of qubits, of states with the target quantum numbers. This makes circuits comprising these gates especially advantageous ansätze for simulating fermionic systems with variational quantum algorithms such as the variational quantum eigensolver (VQE). TABLE 2 lists gates used in the definition of the quantum number preserving gates in TABLE 1 and their decompositions. The decompositions are given for gates being applied to qubits labeled [0, 1, 2, 3] and we use the same notation and conventions as in TABLE 1.

TABLE 2

| Gate and parameter name | Decomposition |
|---|---|
| ANDCReFermionEx(theta) | CNOT(qubits = [3, 2])<br>RZ(−π, qubits = [3])<br>CRY(−theta/4, qubits = [0, 3])<br>CNOT(qubits = [0, 1])<br>CRY(theta/4, qubits = [1, 3])<br>CNOT(qubits = [0, 1])<br>CRY(−theta/4, qubits = [1, 3])<br>CZ(qubits = [2, 3])<br>CRY(theta/4, qubits = [0, 3])<br>CNOT(qubits = [0, 1])<br>CRY(−theta/4, qubits = [1, 3])<br>CNOT(qubits = [0, 1])<br>CRY(theta/4, qubits = [1, 3])<br>RZ(π, qubits = [3])<br>CNOT(qubits = [3, 2])<br>CZ(qubits = [2, 3])<br>PauliZ(qubits = [3]) |
| NORCReFermionEx(theta) | PauliX(qubits = [0])<br>PauliX(qubits = [1])<br>CNOT(qubits = [3, 2])<br>RZ(−π, qubits = [3])<br>CRY(−theta/4, qubits = [0, 3])<br>CNOT(qubits = [0, 1])<br>CRY(theta/4, qubits = [1, 3])<br>CNOT(qubits = [0, 1])<br>CRY(−theta/4, qubits = [1, 3])<br>CZ(qubits = [2, 3])<br>CRY(theta/4, qubits = [0, 3])<br>CNOT(qubits = [0, 1])<br>CRY(−theta/4, qubits = [1, 3])<br>CNOT(qubits = [0, 1])<br>CRY(theta/4, qubits = [1, 3])<br>RZ(π, qubits = [3])<br>CNOT(qubits = [3, 2])<br>CZ(qubits = [2, 3]) |

TABLE 2-continued

| Gate and parameter name | Decomposition |
|---|---|
| | PauliZ(qubits = [3]) PauliX(qubits = [0]) PauliX(qubits = [1]) |
| QNP_A1B0(theta) | NORCReFermionEx(theta, qubits = [1, 3, 0, 2]) |
| QNP_A0B1(theta) | NORCReFermionEx(theta, qubits = [0, 2, 1, 3]) |
| QNP_A2B1(theta) | ANDCReFermionEx(theta, qubits = [0, 2, 1, 3]) |
| QNP_A1B2(theta) | ANDCReFermionEx(theta, qubits = [1, 3, 0, 2]) |

In an embodiment the method further comprises a parametrized quantum circuit, an example of which is displayed in FIG. 1 for the case of 12 qubits (but which can be straight forwardly generalized to any number of qubits) that combines the quantum number preserving gates with an OrbitalFSWAP gate (defined in TABLE 2). If the seq-int Jordan-Wigner mapping is used, this circuit layout has the advantageous effect of bringing every pair of alpha and beta qubits next to every other pair of such qubits in a circuit of depth linear in the number of orbitals. In this way a quantum number preserving gates can be applied between every two pairs of qubits representing alpha and beta orbitals.

FIG. 1 shows an example of an advantageous quantum circuit comprising parametrized quantum number preserving gates that can be used to approximate the energy of a fermionic system with 12 spin orbitals mapped to 12 qubits. Each horizontal line represents a qubit. The boxes are quantum gates. The boxes labeled "X" are PauliX gates, the boxes labeled "OFS*QNP" are gates composed of the quantum number preserving gates in TABLE 1 according to FIG. 2. This circuit preserves all three target quantum numbers $N_\alpha$,$N_\beta$,s because of the following two facts: (1) The individual gates preserve the three quantum numbers, (2) It follows from fundamental properties of the commutator of operators that a product of quantum number preserving gates also preserves the quantum numbers. The diamond shaped structure can be straightforwardly generalized to other numbers of qubits. FIG. 2 shows a circuit representation of the decomposition of the OFS*QNP gates from FIG. 1 into the quantum number preserving gates from TABLE 1. The information in TABLES 1 and 2 allows to decompose the gates into the standard universal gates set.

Additional Material

Depending on the kind of computational unit of a quantum computer and their physical realization, the operations to realize the application of a logical quantum gate can have substantially different physical implementations. The examples below are provided for the standard case of qubits in a standard universal gate library of one and two qubit gate operations.

This is purely for sake of concreteness and not meant to limit the claims of this disclosure. In some quantum computing architectures, other gate operations may directly correspond to physically implementable actions on the computational units. For example, some of the concrete gates described below may be realizable natively in this sense in quantum computers whose computational units are fermions.

Examples

On the following we describe an advantageous embodiment of the method. One skilled in the art will recognize that this is one of many specific embodiments of the method detailed in the claims (particularly the general method of claims 1 and 2), and that while we provide this section to aid in technical absorption of the method, the method is not limited by these specifics:

In the following description we utilize quantum number preserving gates from the set QNP_A10B01, QNP_A12B21, QNP_A1B_PX, QNP_A1B1_PBL, QNP_A1B_PBU, OrbitalFSWAP (described above and previously disclosed in application 63/086,555) and the gate QNP_OrbitalGivens which is defined in FIG. 5.

Figure 3:
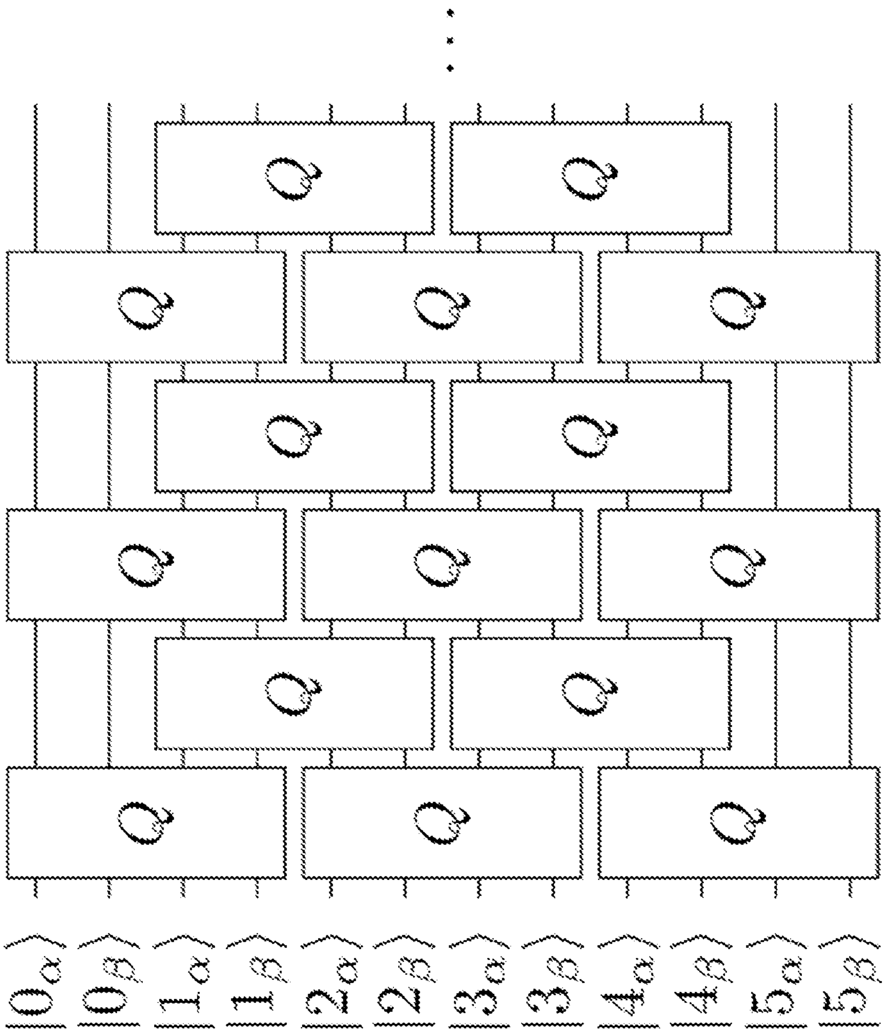
FIG. 3 shows a circuit with gate elements arranged in a fabric pattern.
Figure 4:
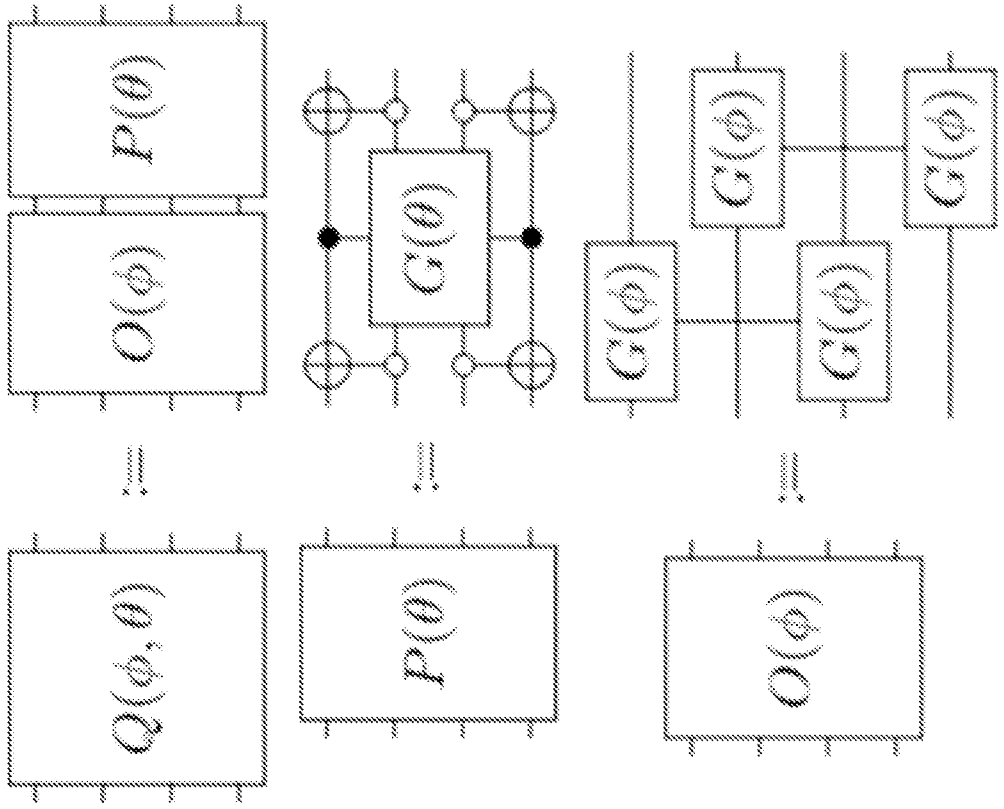
FIG. 4 shows an example gate composition for the gates of FIG. 3.

In one embodiment, the quantum number preserving gate elements Q may be arranged in a fabric, e.g., a potentially infinitely extendible, local, geometric pattern, such as that in FIG. 3. This fabric may exhibit the property of being composed of a single gate element type Q (possibly with different parameters applied for each Q). The gate elements Q can be composed of products of quantum number preserving gates such as QNP_A10B01, QNP_A12B21, QNP_A1B1_PX, QNP_A1B1_PBL, QNP_A1B1_PBU, OrbitalFSWAP, or QNP_OrbitalGivens. A particularly advantageous choice is a combination of QNP_OrbitalGivens and QNP_A1B1_PX as depicted in FIG. 4. As described earlier, computational units may be qubits, qudits, fermions, bosons, or other local quantum computational units. FIGS. 3-5 describe the gate element layout and gate decomposition for the case where the computational units are qubits. For cases where other computational units are used, the gate element layout and gate decompositions may be correspondingly modified.

Additional Material

In some embodiments, aspects of the disclosure may be implemented on a quantum computer and may be accessed via quantum computing as a service (QCaaS), for example, as described in U.S. Pat. No. 10,614,370.

What is claimed is:

1. A method for preparing one or more quantum states in a quantum computer representing states of a system of fermions with m modes, particle number operators $\hat{N}_\alpha$, $\hat{N}_\beta$, and total spin squared operator $S^2$, and target quantum numbers $N_\alpha$, $N_\beta$, and s, corresponding to $\hat{N}_\alpha$, $\hat{N}_\beta$, and $S^2$ respectively, the method comprising:

mapping the fermions to computational units of the quantum computer such that subsets of the computational units represent subsets of modes of the fermions and a set of the quantum states of the computational units corresponds to a set of quantum states of the fermions;

initializing one or more initial states of the computational units which correspond to states of the fermions as a result of the mapping, the states of the computational units and the states of the fermions being eigenstates of the respective computational unit and fermionic representations of the particle number operators $\hat{N}_\alpha$, $\hat{N}_\beta$ and the total spin squared operator $S^2$ with target quantum numbers $N_\alpha$, $N_\beta$, and s;

applying a quantum circuit comprising parametrized gates acting on subsets of the computational units of the quantum computer to transform the one or more initial states to one or more new states, the parametrized gates having one or more parameters and preserving the target quantum numbers $N_\alpha$, $N_\beta$, and s, at least one of the gates comprising a seniority non-conserving operator configured to transform between states of different seniority while preserving the target quantum numbers $N_\alpha$, $N_\beta$, and s, wherein the parametrized gates are arranged such that the circuit depth of the quantum circuit scales less than cubically with the number m of fermionic modes;

preparing the states of the computational units of the quantum computer to be in a subspace of states that corresponds to states having the target quantum numbers $N_\alpha$, $N_\beta$, and s, wherein the prepared states in that subspace have been transformed according to values of the one or more parameters of the parametrized gates; and measuring one or more observable quantities of the computational units of the quantum computer;

wherein each computational unit is physically enabled and characterized by a discrete or continuous number of controllable quantum states, wherein computational units can be combined to increase the computational power of the quantum computer via quantum coherence between quantum states of the computational units.

2. The method according to claim 1, wherein the computational units of the quantum computer are qubits.

3. The method according to claim 1, wherein the computational units of the quantum computer are fermions.

4. The method of claim 1, wherein the method is a computer-implemented method.

5. The method of claim 1, further comprising: transmitting and/or receiving a description of the fermionic system and/or the measured observable quantity or results derived from such measured observable quantity to/from the quantum computer.

6. The method of claim 1, wherein the parametrized quantum circuit comprises one or more of the quantum number preserving gates QNP_A10B01, QNP_A12B21, QNP_A1B1_PX, QNP_A1B1_PBL, QNP_A1B1_PBU, OrbitalFSWAP, or QNP_OrbitalGivens.

7. The method of claim 1, wherein the computational units of the quantum computer are qubits, and wherein representations of the quantum number preserving gates are used that have the property of acting on subsets of qubits, the subsets of qubits having the property that the quantum hardware is able to make the qubits in these subsets interact with a number of elementary native gate operations independent of the total number qubits and the parametrized quantum circuit having the property of logically or physically moving subsets of qubits corresponding to different orbitals such that the representations of the quantum number preserving gates can act on them.

8. The method of claim 1, wherein the system of fermions describes electrons of a chemical system comprising one or more molecules, atoms, charges, electrons, or their antiparticles.

9. The method of claim 1, wherein the one or more parameters are changed with the goal of preparing a state with the target quantum numbers as well as further properties equaling target values or being as high or low as possible, where the further properties are observable quantities of a quantum state or quantities that can be computed from such observable quantities.

10. The method of claim 1, wherein the minimization or maximization of an observable quantity of the prepared states is performed via an iterative procedure.

11. The method of claim 1, further comprising steps to performing a simulation of a chemical reaction or properties of such chemical reaction.

12. The method of claim 1, wherein the quantum computer is realized with one of the following approaches: superconducting qubits, trapped ions, trapped atoms, photons, quantum dots, nitrogen vacancy centers in diamond, spin qubits in silicon, nuclear magnetic resonance, or topological quantum computing.

13. The method of claim 1, wherein the computational units of the quantum computer are qubits, and wherein each qubit is acted on non-trivially by at least one of the gates.

14. A non-transitory computer-readable storage medium comprising instructions which, when executed by a computer including a quantum computer, cause the computer to perform operations that prepare one or more quantum states in the quantum computer representing states of a system of fermions with m modes, particle number operators $\hat{N}_\alpha$, $\hat{N}_\beta$, and total spin squared operator $S^2$, and target quantum numbers $N_\alpha$, $N_\beta$, and s, corresponding to $\hat{N}_\alpha$, $\hat{N}_\beta$, and $S^2$ respectively, the operations comprising:

mapping the fermions to computational units of the quantum computer such that subsets of the computational units represent subsets of modes of the fermions and a set of the quantum states of the computational units corresponds to a set of quantum states of the fermions;

initializing one or more initial states of the computational units which correspond to states of the fermions as a result of the mapping, the states of the computational units and the states of the fermions being eigenstates of the respective computational unit and fermionic representations of the particle number operators $\hat{N}_\alpha$, $\hat{N}_\beta$ and the total spin squared operator $S^2$ with target quantum numbers $N_\alpha$, $N_\beta$, and s;

applying a quantum circuit comprising parametrized gates acting on subsets of the computational units of the quantum computer to transform the one or more initial states to one or more new states, the parametrized gates having one or more parameters and preserving the target quantum numbers $N_\alpha$, $N_\beta$, and s, at least one of the gates comprising a seniority non-conserving operator configured to transform between states of different seniority while preserving the target quantum numbers $N_\alpha$, $N_\beta$, and s, wherein the parametrized gates are arranged such that the circuit depth of the quantum circuit scales less than cubically with the number m of fermionic modes;

preparing the states of the computational units of the quantum computer to be in a subspace of states that corresponds to states having the target quantum numbers $N_\alpha$, $N_\beta$, and s, wherein the prepared states in that subspace have been transformed according to values of the parameters of the one or more parametrized gates; and measuring one or more observable quantities of the computational units of the quantum computer;

wherein each computational unit is physically enabled and characterized by a discrete or continuous number of controllable quantum states, wherein computational units can be combined to increase the computational power of the quantum computer via quantum coherence between quantum states of the computational units.

15. The non-transitory computer-readable storage medium of claim 14, wherein the computational units of the quantum computer are qubits.

16. The non-transitory computer-readable storage medium of claim 14, wherein the computational units of the quantum computer are fermions.

17. The non-transitory computer-readable storage medium of claim 14, further comprising: transmitting and/or receiving a description of the fermionic system and/or the measured observable quantity or results derived from such measured observable quantity to/from the quantum computer.

18. The non-transitory computer-readable storage medium of claim 14, wherein the parametrized quantum circuit comprises one or more of the quantum number preserving gates QNP_A10B01, QNP_A12B21, QNP_A1B1_PX, QNP_A1B1_PBL, QNP_A1B1_PBU, OrbitalFSWAP, or QNP_OrbitalGivens.

19. The non-transitory computer-readable storage medium of claim 14, wherein the computational units of the quantum computer are qubits, and wherein representations of the quantum number preserving gates are used that have the property of acting on subsets of qubits, the subsets of qubits having the property that the quantum hardware is able to make the qubits in these subsets interact with a number of elementary native gate operations independent of the total number qubits and the parametrized quantum circuit having the property of logically or physically moving subsets of qubits corresponding to different orbitals such that the representations of the quantum number preserving gates can act on them.

20. A data processing apparatus system comprising a quantum computer and configured to prepare one or more quantum states in the quantum computer representing states of a system of fermions with m modes, particle number operators $\hat{N}_{\alpha}$, $\hat{N}_{\beta}$, and total spin squared operator $S^2$, and target quantum numbers $N_{\alpha}$, $N_{\beta}$, and s, corresponding to $\hat{N}_{\alpha}$, $\hat{N}_{\beta}$, and $S^2$ respectively, wherein to prepare the one or more quantum states, the data processing apparatus system is further configured to perform operations comprising:

mapping the fermions to computational units of the quantum computer such that subsets of the computational units represent subsets of modes of the fermions and a set of the quantum states of the computational units corresponds to a set of quantum states of the fermions;

initializing one or more initial states of the computational units which correspond to states of the fermions as a result of the mapping, the states of the computational units and the states of the fermions being eigenstates of the respective computational unit and fermionic representations of the particle number operators $\hat{N}_{\alpha}$, $\hat{N}_{\beta}$ and the total spin squared operator $S^2$ with target quantum numbers $N_{\alpha}$, $N_{\beta}$, and s;

applying a quantum circuit comprising parametrized gates acting on subsets of the computational units of the quantum computer to transform the one or more initial states to one or more new states, the parametrized gates having one or more parameters and preserving the target quantum numbers $N_{\alpha}$, $N_{\beta}$, and s, at least one of the gates comprising a seniority non-conserving operator configured to transform between states of different seniority while preserving the target quantum numbers $N_{\alpha}$, $N_{\beta}$, and s, wherein the parametrized gates are arranged such that the circuit depth of the quantum circuit scales less than cubically with the number m of fermionic modes;

preparing the states of the computational units of the quantum computer to be in a subspace of states that corresponds to states having the target quantum numbers $N_{\alpha}$, $N_{\beta}$, and s, wherein the prepared states in that subspace have been transformed according to values of the one or more parameters of the parametrized gates; and measuring one or more observable quantities of the computational units of the quantum computer;

wherein each computational unit is physically enabled and characterized by a discrete or continuous number of controllable quantum states, wherein computational units can be combined to increase the computational power of the quantum computer via quantum coherence between quantum states of the computational units.

* * * * *